Aug. 11, 1931.    R. W. BURNETT    1,818,194
SLACK ADJUSTER FOR CAR BRAKES
Filed April 13, 1929    2 Sheets-Sheet 1
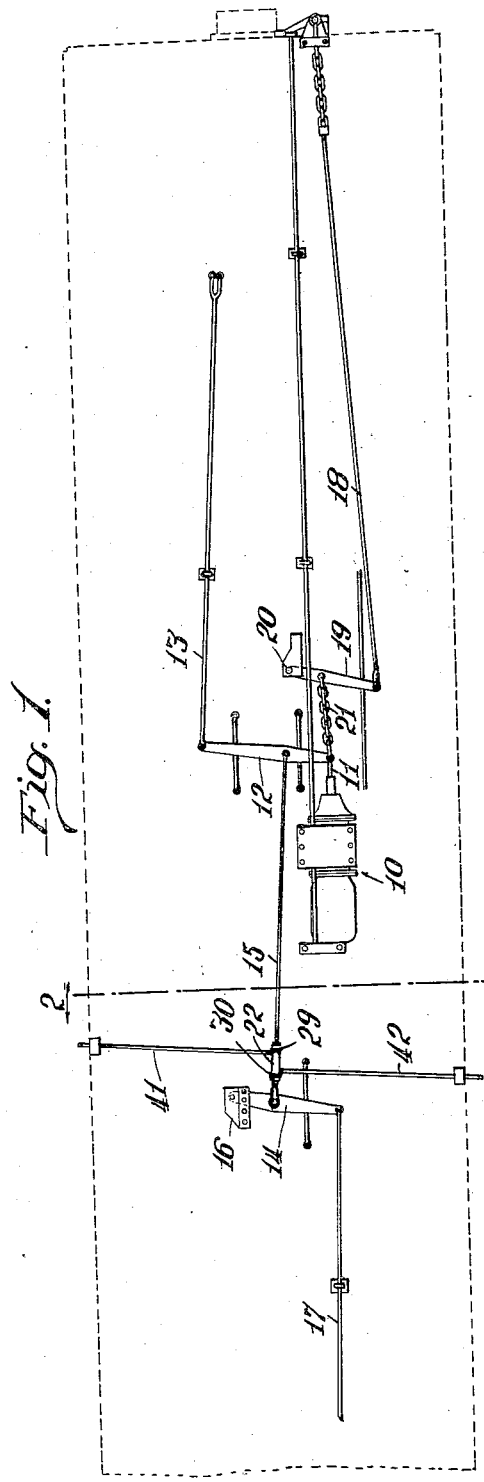
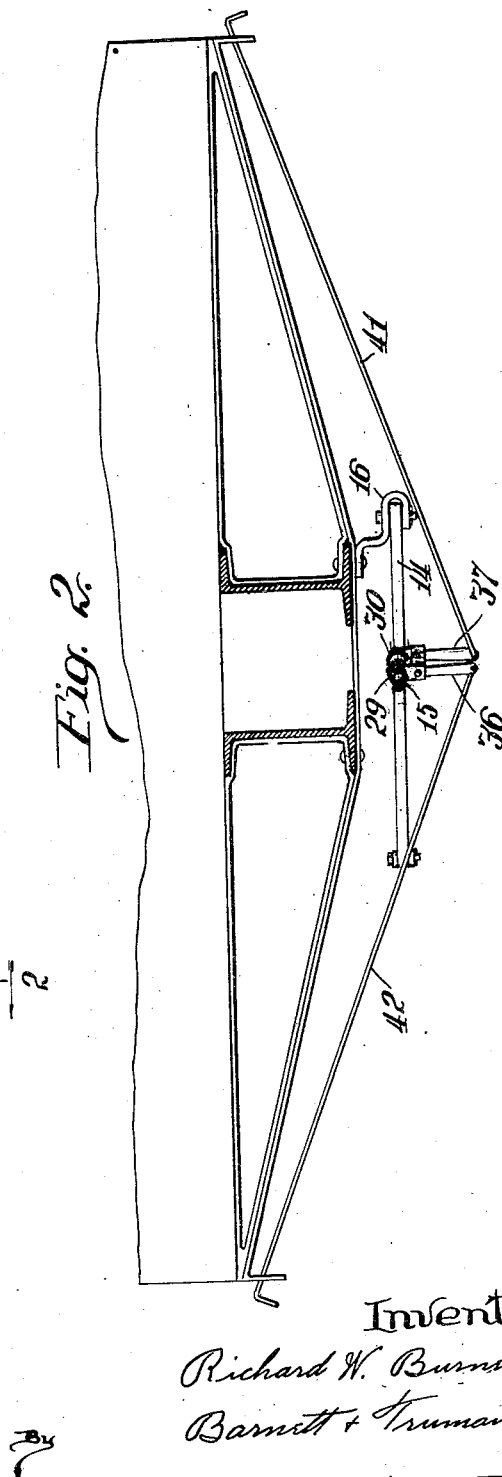
Inventor
Richard W. Burnett.
Barnett & Truman
By
Attorneys

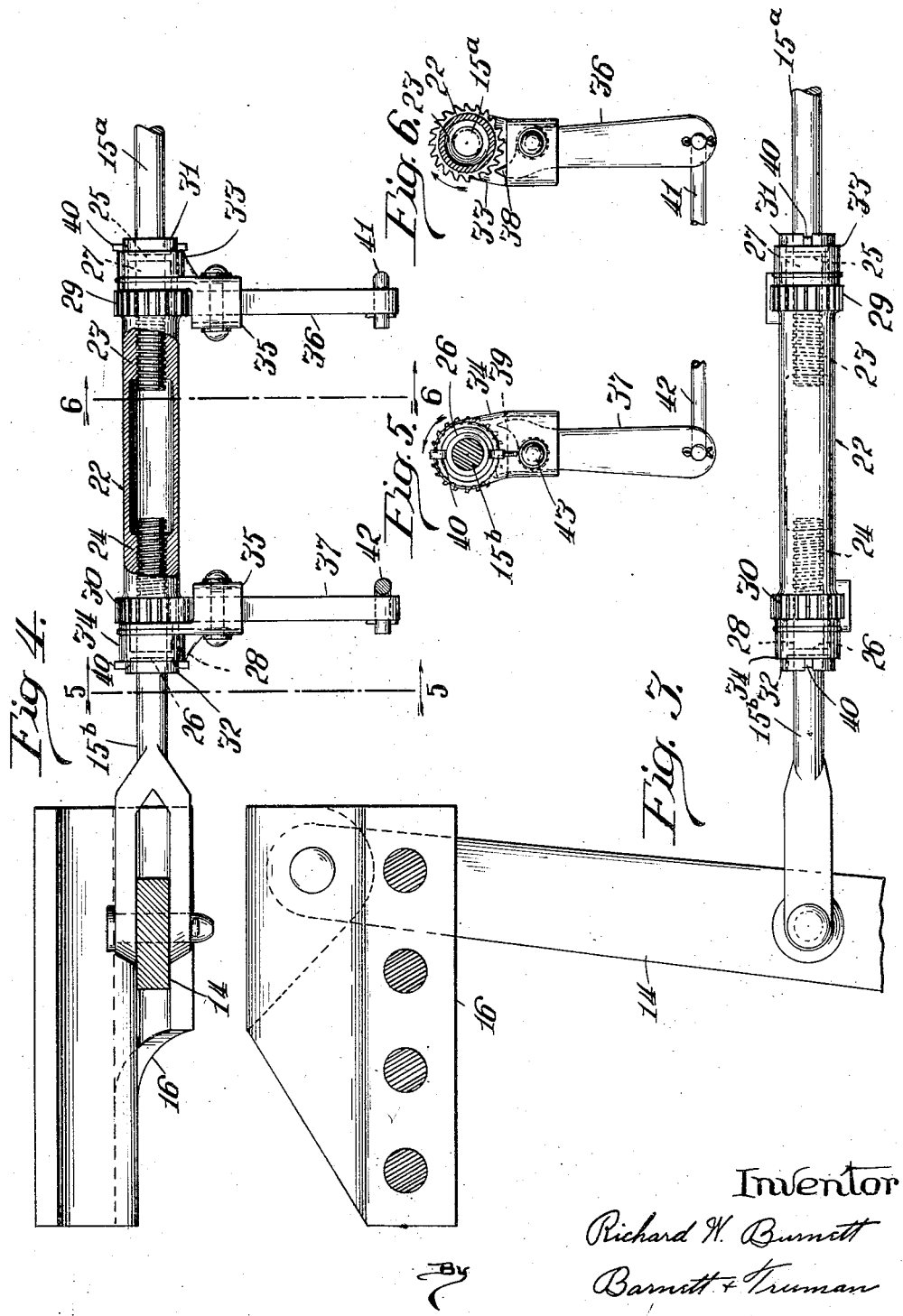

Patented Aug. 11, 1931

1,818,194

UNITED STATES PATENT OFFICE

RICHARD W. BURNETT, OF CHICAGO, ILLINOIS

SLACK ADJUSTER FOR CAR BRAKES

Application filed April 13, 1929. Serial No. 354,883.

My invention relates to improvements in slack adjusters for the brake rigging of railway cars.

The primary object of the invention is to simplify devices of this character and to provide reliable means whereby slack in the brake rigging may be removed or provided, as may be desired, without requiring the workmen to go under the car.

A more specific object of my present invention is to provide a slack adjuster suitable for use in the various locations of a brake rigging, for example, as shown in my copending application Serial No. 332,552, but in which the body of the adjusting member may be rotated either forwardly or backwardly by means of operating mechanism extending to the side of the car.

Another specific object is to provide separate operating means for rotating the adjuster body in opposite directions, which means are supported by the body but are normally disengaged therefrom, whereby the body may be rotated in one direction without affecting the operating means for imparting a motion thereto in the opposite direction.

A further specific object is to provide the adjuster body with suitable end bearings which, in addition to maintaining the adjuster body in proper alignment with the member with which it is adjustably connected, provide suitable means for preventing the entrance of foreign matter to the screw threaded portions of the members and thereby insure efficiency in operation.

Other objects of the invention will appear from the detailed description of the embodiment shown in the acompanying drawings.

In the drawings:

Fig. 1 is a fragmentary plan view of the brake rigging of a railway car showing one preferred location of my improved slack adjuster;

Fig. 2 is a cross-sectional view taken on line 2—2 of Fig. 1.

Fig. 3 is a view showing the fulcrum bracket lever and connecting rod of the brake rigging in the same relative position as shown in Fig. 1 and illustrating my improved slack adjuster interposed in the said rod.

Fig. 4 is a side view of the construction shown in Fig. 3.

Fig. 5 is a cross-sectional view taken on line 5—5 of Fig. 4, looking in the direction indicated by the arrows, and Fig. 6 is a similar view taken on line 6—6 of Fig. 4.

My improved slack adjuster may be used in connection with brake riggings of various constructions and positioned at various locations in said riggings so that upon operation of the adjuster, a uniform movement will be imparted to the brake shoes to move them toward or away from the truck wheels, as the conditions may require. When it is desired to apply new brake shoes, the adjuster is operated to increase the slack in the rigging temporarily until the brake shoes have been placed in operative position. The adjusting device may then be operated in the opposite direction so as to move the brake shoes to a proper position relative to the car wheels. In the drawings I have illustrated one form of car brake rigging, but the particular form herein shown is used merely for the purpose of illustration to show one preferred location of the slack adjuster. The brake rigging illustrated consists of an air brake cylinder 10 having its piston rod 11 attached to one end of a cylinder lever 12. The other end of the lever 12 is connected, by means of a suitable connecting rod 13, to the truck lever (not shown). The cylinder lever 12 is connected to a floating lever 14 by means of a connecting rod 15. The lever 14 is fulcrumed at one end in a bracket 16 and is attached at the other end to a rod 17 extending to the truck levers at the other end of the car. In this type of brake rigging my slack adjuster is preferably interposed in the connecting rod 15 in substantially the location indicated in Fig. 1, so that operation of the adjusting device will simultaneously adjust the position of the brake shoes at opposite ends of the car without affecting the hand brake adjustment. The hand brake is indicated in Fig. 1 by means of a hand brake pull rod 18 connected to the hand brake lever 19, the latter being fulcrumed at 20 and connected to the piston rod 11 by means of a flexible connector 21.

The adjuster preferably consists of a hollow cylindrical body 22 having a threaded engagement with the adjacent ends of the sections 15a, 15b of the rod 15. The internal threaded portion 23 of the body is formed with left hand threads and the threaded portion 24 at the other end of the body is provided with right hand threads. Rotation of the body 22 in one direction moves the rod sections 15a, 15b toward each other and consequently takes up the slack in the brake rigging, whereas rotation of the body 22 in the opposite direction increases the slack in said rigging. The threaded portions 23 and 24 are preferably spaced inwardly from the ends of the body so that the threaded ends of the rod sections, under normal condition, will be entirely enclosed within the body 22. This construction avoids collection of rust and dirt on the threaded ends of the rod sections and thereby insures reliable operation at all times. Internal bearings 25, 26 are formed at opposite ends of the body in spaced relation to the threaded portions 23 and 24 and are adapted to bear upon the rod sections 15a, 15b. The bearings are preferably reamed so as to accurately fit the rod sections and thereby maintain them in proper alignment so as to relieve the threaded portions of the sagging strains. The hollow portion 26 of the body and likewise the hollow portions 27 and 28 provide suitable chambers for lubricant, the bearings 25 and 26 serving to prevent the loss of lubricant and also serving to seal the interior from the entrance of grit or other foreign matter.

The body 22 is provided on its outer surface with ratchet wheels 29 and 30. The said ratchet wheels are preferably formed integrally with the body and are spaced a short distance from the ends of the body so as to provide hub portions 31, 32. The teeth of one ratchet wheel are arranged in an opposite relation to the teeth in the other ratchet wheel (Figs. 5 and 6). The teeth in the ratchet wheel 30 are formed so that operation of the operating lever in one direction imparts a rotary movement to the body 22 in a counterclockwise direction with reference to Fig. 5, whereas operating the lever at the other end of the body imparts a clockwise movement of the body, as will be seen in Fig. 6. The ratchet levers for operating the body are preferably formed in two parts and consist in each case of a bearing member and a combined pawl and operating lever. The bearings 32, 33 fit over the hub portions 31, 32 of the body at opposite ends thereof and are provided with socket portions 34, 35 which extend under the ratchet wheels 29, 30. Combined pawl and operating levers 36, 37 are pivoted in the sockets of the said bearing members so that movement about their pivots will bring the toothed ends 38, 39 into engagement with the teeth of the adjacent ratchet wheels. The bearing members are supported in their operative positions on the body by means of lugs 40, which are bent upwardly, to lock the bearing members against any substantially longitudinal movement. Operating rod 41 extends from the lever 36 to one side of the car and operating lever 42 extends from the lever 37 to the other side of the car. In this connection it will be apparent, however, that the rods 41 and 42 may, if desired, extend to the same side of the car, in which event the rotation of the body 22 will be imparted by pushing action of one of said rods and a pulling action of the other. The bearing members 32, 33 are loose on the hub portion of the body, thus permitting free rotation of the bearing members about the hubs when the levers are moved in one direction. This free movement of the bearing members together with the weight of the lever members insures the return of the levers, by gravity, to their normal positions. The weight of the levers 36—37 maintains them normally in a vertical position with the toothed end of each lever out of engagement with the adjacent ratchet wheel. The walls of the sockets in which the levers 36—37 are pivoted provide stops to limit the pivotal movement of said levers relative to their associated bearing members.

It will be apparent from an inspection of Fig. 5 that the bearing member 34 can be operated in a clockwise direction without imparting movement to the body member, but upon movement of the lever arm 37 in a counter clockwise direction about its pivotal axis 43, moves the tooth 39 of the lever into engagement with the ratchet teeth so that further movement of the lever in a counterclockwise direction will impart a corresponding movement to the body member 22.

While I have described one specific construction of slack adjusting members, it will be obvious to persons familiar with the art that various modifications in structure might be made without departure from the spirit of the invention. It will therefore be understood that I desire to claim both broadly and specifically the various modified constructions coming within the scope of the appended claims.

I claim:

1. A slack adjuster for brake rigging comprising a body member provided with a threaded portion for engagement with a rod of the brake rigging, a bearing member operable about the body, and a lever pivoted on said bearing member adapted, when moved about its pivotal axis in one direction, to grip the body.

2. A slack adjuster for brake rigging comprising a body member provided with a threaded portion for engagement with a rod of the brake rigging, a bearing member operable about the body, a lever pivotally supported on said bearing at a point removed from the longitudinal axis of said body and movable with said bearing in one direction relative to the body and adapted to grip the body when moved in the opposite direction.

3. A slack adjuster comprising a tubular body provided with a threaded portion spaced from its end for engagement with a threaded rod of a car brake rigging and provided near its end with a bearing adapted to engage said rod, to support the rod and body in alignment and to exclude the entrance of foreign matter.

4. A slack adjuster comprising a tubular body member provided with a threaded portion for engagement with a threaded rod of a car brake rigging, and means at the side of the car for rotating said tubular body in either direction comprising two levers, each comprising a bearing adapted to move in one direction relative to said body and a lever pivoted thereto adapted when moved in the other direction, to clutch the said body and impart rotational movement thereto.

5. A slack adjuster comprising a body member threaded at one end for engagement with a threaded rod of a car brake rigging, means for operating the body from a position at the side of the car comprising a bearing member movable about said body, a lever pivoted to said bearing in a position to normally remain out of engagement with the body, but adapted, when moved in one direction to clutch the body, and means extending from the said lever to the side of the car for imparting operating movements to said lever.

6. A slack adjuster comprising a body member threaded at one end for engagement with a threaded rod of a car brake rigging, means for operating the body from a position at the side of the car comprising a bearing member movable about said body, a lever pivoted to said bearing in a position to normally remain out of engagement with the body, but adapted when moved in one direction to clutch the body, stop means to limit the pivotal movement of the lever relative to said bearing member, and means extending from said lever to the side of the car for imparting operating movements to the lever.

7. A slack adjuster comprising a body member having a threaded engagement with a rod of a car brake rigging and provided with ratchet teeth, means for rotating the body comprising a bearing member movable about said body, a lever pivoted to said bearing member and provided with a portion adapted, upon movement of the lever about its pivot, to move the said lever into engagement with a ratchet tooth and impart rotational movement to said body, means for limiting the pivotal movement of the lever relative to said bearing member, and an operating rod extending from said lever to the side of the car.

8. A slack adjuster comprising a body member having right and left hand threads at opposite ends for engagement with threaded rods of a car brake rigging, means for imparting rotational movement to the body in one direction comprising a ratchet member on said body, a two part operating lever including a bearing member operable about the said body and a pivoted bearing pawl and lever carried by said bearing member and adapted when moved in one direction to engage a tooth of the said ratchet to impart rotational movement to the body, and means for imparting rotational movement to the body in the opposite direction comprising a ratchet member on the body and a two-part operating lever for engagement with the ratchet wheel comprising a bearing member operable about the body of said adjuster and a combined pawl and lever pivoted on said bearing member and adapted when moved in one direction to engage a tooth of said last mentioned ratchet member, to impart said reverse movement to the body.

9. A slack adjuster comprising a tubular body member provided with a threaded portion for engagement with a threaded rod of a car brake rigging, means for rotating said tubular body about the threaded portion of said rod, operating levers revoluble about said body and adapted to assume their normal position by action of gravity, and means extending from each of said levers to the side of the car for operating the said body in opposite directions.

RICHARD W. BURNETT.